April 14, 1964
R. C. SCOTT
3,128,621
HORIZONTAL HARDNESS TESTER
Filed Sept. 19, 1960
2 Sheets-Sheet 1
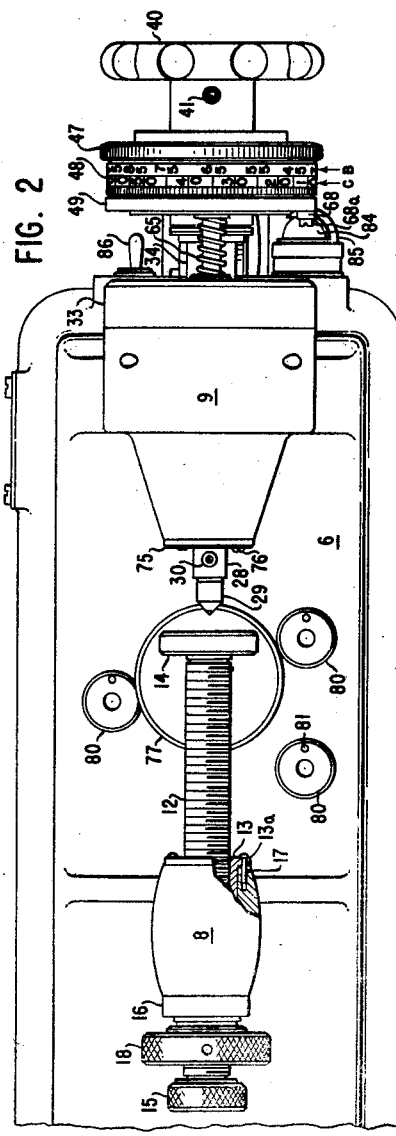
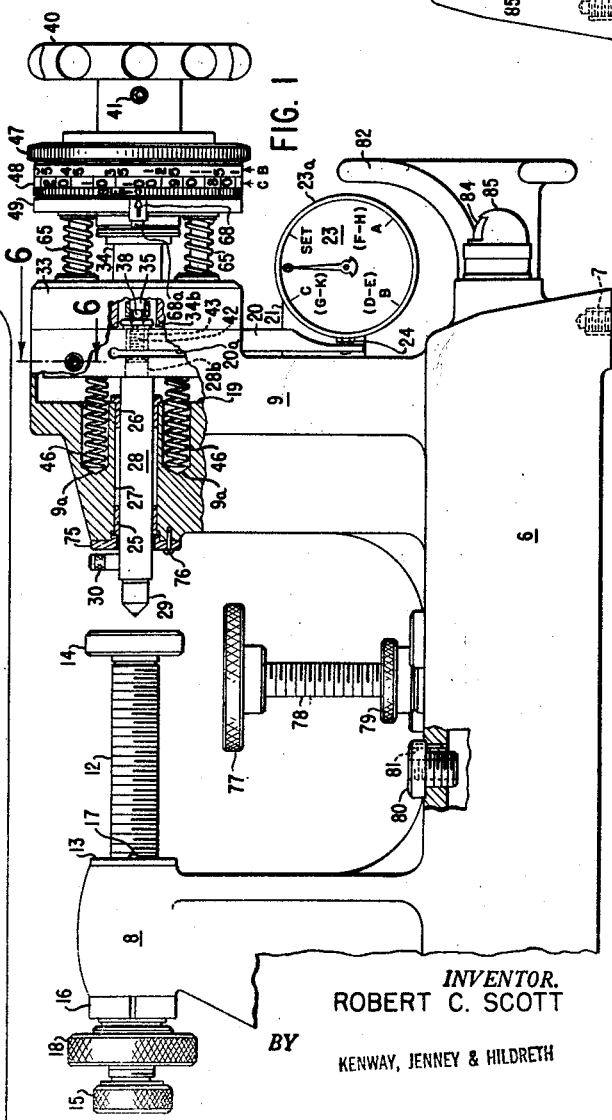
INVENTOR.
ROBERT C. SCOTT
BY KENWAY, JENNEY & HILDRETH
ATTORNEYS

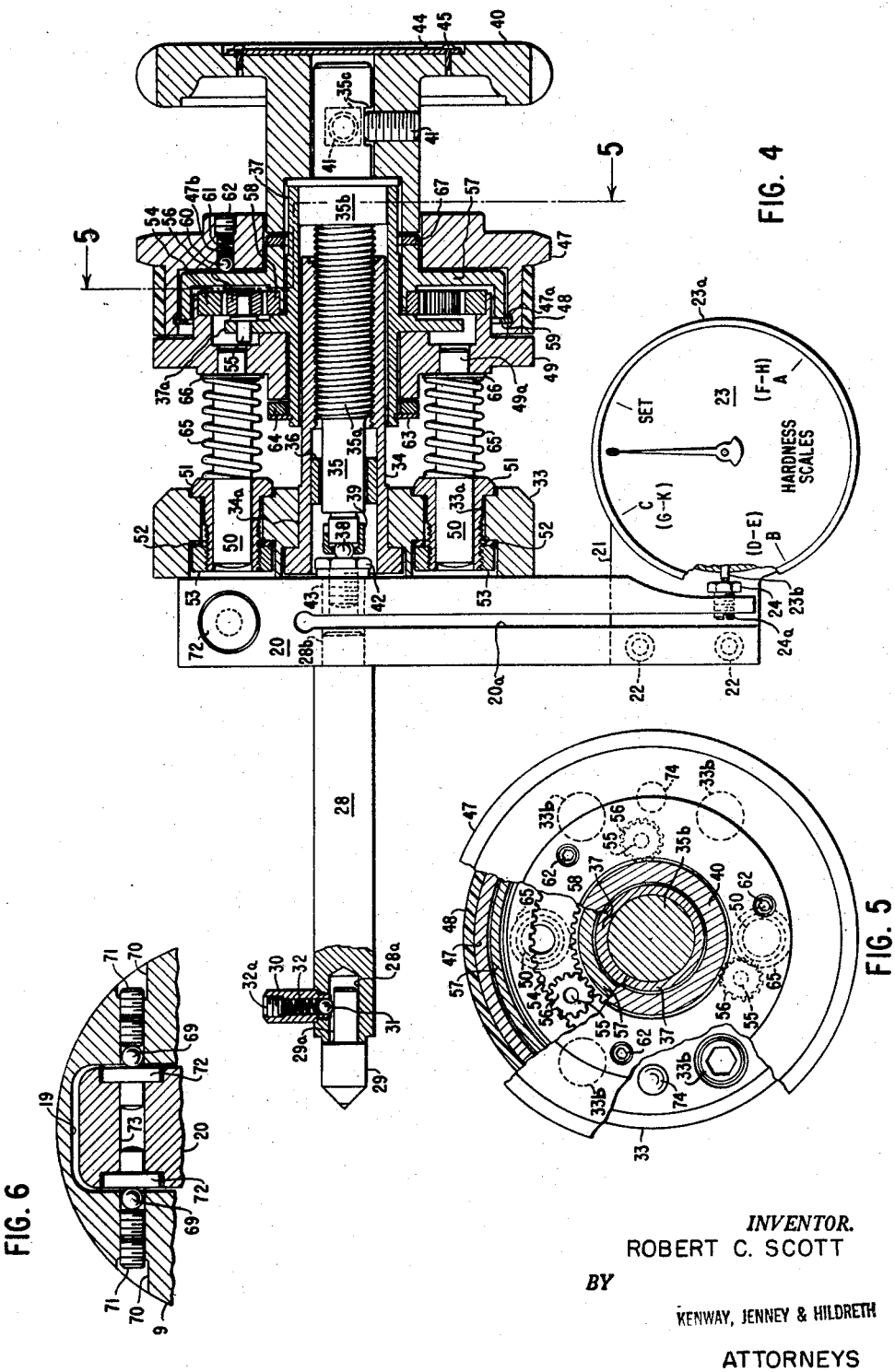

United States Patent Office 3,128,621
Patented Apr. 14, 1964

3,128,621
HORIZONTAL HARDNESS TESTER
Robert C. Scott, 340 Common St., Belmont, Mass.
Filed Sept. 19, 1960, Ser. No. 56,770
2 Claims. (Cl. 73—81)

This invention relates to machines for testing the hardness of materials, especially metals, but including plastics and other forms of synthetic and natural materials in the solid state, the measurement of whose property of hardness is of importance.

The invention has among its objects to provide a hardness testing machine that is especially adapted to test the hardness of materials having variously formed shapes and surfaces, that is light in weight and compactly constructed, that can be readily movde to hardness testing sites within laboratories and manufacturing plants, that assures accurate hardness measurements, that is rapid in its operation upon the softer as well as the harder materials, and that provides a maximum of vision and convenience with a minimum of fatigue in its operation.

In carrying out the aforementioned objects, I provide an improved hardness tester in which various features are combined. These features include the mounting of a specimen penetrator in a first vertically extending bracket formed in a support or main frame, for movement along a penetration axis. A spindle assembly for applying a load to the penetrator along the penetration axis, and for measuring the resulting depth of penetration of a specimen, is also mounted in the first bracket. The spindle assembly includes means for preventing back-lash of threaded elements thereof, which improve the accuracy of measurement of the penetration. The load applied to the penetrator is measured by means including a calibrated spring providing elastic deflection with negligible hysteresis and drift for all values of loading. The main frame is also formed with a second vertically-extending bracket spaced apart from the first, in which is mounted a first anvil adapted to axially support a specimen to be tested. The anvil is mounted for adjustment along the penetration axis to accommodate specimens of various sizes. A second anvil is mounted in the main frame for cooperation with the first anvil, and is adjustable along an axis transverse to the penetration axis for supporting specimens of various shapes and sizes. The main frame, normally in the horizontal plane, may be turned to a relatively large angle in any direction from the horizontal plane without impairing the accuracy of hardness readings.

The penetrator is movable by the spindle assembly in a gradual manner, which protects diamond penetrators from fracture and ball penetrators from flattening during the initial application of these penetrators to a specimen. The mechanism is relatively insensitive to normally encountered values of transmitted vibration. Furthermore, the penetrator, load indicator, and hardness scale are all located conveniently in the same angle of vision.

While the subject matter which I regard as my invention is particularly pointed out in the appended claims, it is believed that the invention will be more clearly understood from the following detailed description of a preferred embodiment thereof, referring to the accompanying drawings, in which:

FIG. 1 is a view in side elevation and partially in section of a preferred embodiment of the hardness tester;

FIG. 2 is a top plan view;

FIG. 3 is an end view;

FIG. 4 is a sectional elevation of the penetrator spindle assembly and the load measuring mechanism;

FIG. 5 is a sectional end view of the penetrator spindle assembly, taken along line 5—5 in FIG. 4, looking in the direction of the arrows; and FIG. 6 is a sectional view of a load spring forming a part of the load measuring mechanism, taken along line 6—6 in FIG. 1, looking in the direction of the arrows.

An improved hardness tester that has been developed by me and found to work satisfactorily is illustrated in the drawings, and includes a main frame 6 which supports the various parts of the machine, and which may be bolted to a bench or other surface by means of "Helicoil" inserts 7 provided in the underside thereof. The base of the main frame is ribbed on the underside to minimize weight, and is cast of a light-weight high tensile strength material such as aluminum alloy, aged and stress-relieved after casting and machining, respectively, to assure dimensional stability of the frame and alignment of the related parts.

Two spaced-apart vertical supporting brackets 8 and 9 are formed in the main frame casting, and support a first anvil spindle assembly and a penetrator spindle assembly, respectively. These assemblies are aligned on a common penetration axis. The first anvil spindle assembly includes an anvil spindle 12, which is preferably made of hardened stainless steel, and is precision threaded throughout its length for engagement with a mating thread formed through a spindle bushing 13 received by the bracket 8. The spindle carries an anvil 14 for supporting a test specimen. A knob 15 is press-fitted to the spindle and serves as a finger grip for effecting threading movement of the spindle along the penetration axis. The spindle bushing 13, preferably made of unhardened stainless steel, receives a bushing lock-nut 16 in threaded engagement thereon. The bushing is press-fitted into the bracket 8, and is secured in position by the bushing lock-nut 16 and by stainless steel drive pins 17, which are pressed through a flange 13a formed in the bushing and into the bracket. A stainless steel spindle lock-nut 18 is threaded on the spindle against the bushing lock-nut 16 to lock the spindle in position by forcing the thread faces of the spindle and bushing together in a direction and manner that precludes even the slightest relative motion between the spindle and bushing when a load is applied to the anvil during the making of a hardness test. The anvil 14 is preferably made of precision-machined hardened stainless steel, and has a supporting and centering shank (not shown) fitted into a bored hole in the spindle in a manner that not only permits interchangeability with anvils of various shapes, but also precludes even the slightest relative motion between the contacting faces of the anvil and spindle during the making of a hardness test.

The bracket 9 is provided with a rectangularly shaped recess 19 to provide clearance spaced for a load spring 20. I prefer to make the load spring of beryllium copper, suitably heat treated after fabricating and machining to provide elastic deflection with negligible hysteresis error and drift under maximum loading. The load spring is longitudinally slotted at 20a to form a compression type of hairpin spring with left and right sections. At the outer end of the load spring, an indicator bracket 21 made of light-weight material such as aluminum alloy is securely fastened to the left section by stainless steel machine screws 22. Clearance space is provided between the bracket and the right spring section to permit freedom of flexure of the spring sections. A sensitive dial indicator 23, having a rotatable bezel 23a for adjusting the dial position, is securely fastened to the bracket. A spring-loaded indicator spindle 23b rests firmly on the highly polished flat surface of a hardened stainless steel button 24, which is threaded into the right section of the load spring and slotted at 24a for adjustment of height. The button 24 is so arranged that the slightest flexure of the load spring due to compression will cause the dial pointer to turn in a clockwise direction and thus indicate the compression on the dial.

The penetrator spindle assembly is guided by oil-impregnated sintered bronze bushings 25 and 26, which are press-fitted into a precision bored hole 27 formed in the supporting bracket 9. A penetrator extension rod 28, which I prefer to make of stainless steel, chromium coated and highly polished, is press-fitted into the left section of the load spring 20. The penetrator extension rod and the load spring assembly are centered and guided by bushings 25 and 26 which are precision aligned and honed to provide a smooth sliding fit for the penetrator extension rod. The outer end of the penetrator extension rod is provided with a center hole 28a into which a penetrator 29 is inserted. The penetrator is secured in place by a retainer 30, comprising a hardened steel ball 31 through which pressure is applied to a flattened section 29a of the penetrator by a compression spring 32. The spring is retained by a set screw 32a, which permits ready removal and replacement of the penetrator. The penetrator may be a sphero-conically shaped diamond, a hardened steel ball, or some other well-known type and shape of penetrating tool.

A cylindrical cap 33, which I prefer to make of high-strength aluminum alloy, is secured to the face of the supporting bracket 9 by cap screws 33b. In the center of the cap and on the axis of the penetrator extension rod 28, an inner tubular support 34 made of hardened steel is press-fitted at 34a and thereby firmly secured against rotation and axial movement. The inner tubular support 34 is precision threaded internally to accommodate a threaded section 35a of a load spindle 35, which is also made of hardened steel. A bronze bushing 36 is interposed between the spindle 35 and the tubular support 34. The bushing is precision aligned and honed to maintain concentric alignment of the load spindle. An outer tubular stainless steel spider 37, which has a smooth sliding fit over the tubular support 34, is press-fitted onto an enlarged portion 35b of the load spindle and hence turns therewith. The left end of the load spindle 35 is seated to conform to the contour of a hardened steel ball 38 which is held in position by a press-fitted stainless steel retaining sleeve 39. A load handwheel 40, made of aluminum alloy or moulded plastic, is fastened to the right end of the load spindle by two set screws 41 that are perpendicular to two flat surfaces 35c, spaced ninety degrees apart about the load spindle. A removable hardened steel button 42, seated to conform to the contour of the ball 38, is screwed into a stainless steel threaded sleeve 43 which is press-fitted into a hole in the load spring 20. The load spring is interposed between the load spindle 35 and the penetrator extension rod 28, which is press-fitted into the load spring at 28b.

By turning the load handwheel 40 in a clockwise direction, as indicated by a direction plate 44 fastened upon the handwheel by rivets 45, the penetrator spindle assembly is moved to the left along the penetration axis. The movement is initially resisted by a pair of return springs 46, received in suitable recesses 9a formed in the bracket. When motion of the penetrator is resisted by contact with a specimen, the load spring 20 is compressed, and this compression will be indicated by the pointer on the dial indicator 23. By turning the load handwheel in a counterclockwise direction as indicated by the direction plate 44, the return springs 46 will move the penetrator to the right along the penetration axis.

A barrel dial 47, which I prefer to make of aluminum alloy with a moulded plastic face 48 cemented thereon, is arranged to rotate in the same direction as the load handwheel but through a greater angle to provide for optimum spacing of hardness scales engraved on the plastic face 48. For approximately one-third revolution of the load handwheel, the barrel dial is made to rotate one revolution, thus providing for greater spacing between hardness numbers and consequently greater accuracy in hardness tests. This is accomplished by means of a planetary gearing mechanism including a non-rotating stainless steel base plate 49, which is concentric with the inner tubular support 34 and the outer tubular spider 37, and is prevented from rotating by a plurality of stainless steel guide pins 50 press-fitted into the base plate at 49a. The guide pins have a smooth sliding fit in stainless steel guide bushings 51, which are secured within holes 33a formed in the cap 33 by stainless steel washers 52 and nuts 53. A precision stainless steel internal gear 54, which is secured to the base plate 49 by a suitable cement, is also concentric with the support 34. On a flanged section 37a of the spider 37 are mounted stainless steel press-fitted studs 55, on which are rotatably supported three small equally spaced precision stainless steel spur gears 56 meshing with the internal gear 54. A bronze inner drum 57 is located concentrically about the spider 37, and a precision stainless steel spur gear 58 is cemented thereto. The gear 58 meshes with the spur gears 56. The barrel dial 47 is received over the inner drum 57 and is retained in position by a spring-retaining ring 59, which is secured within a groove 47a in the barrel dial. A plurality of hardened steel balls 60 are received within equally spaced holes 47b in the upper face of the barrel dial and are biased into engagement with the drum 57 by means of compression springs 61. The balls are retained in place by a plurality of set screws 62. The barrel dial may thus be turned on the inner drum by finger pressure on the outer knurled edge of the barrel dial, but otherwise turns with the inner drum without slippage.

The left end of the outer tubular spider 37 is grooved to accommodate a spring retaining ring 63 which cooperates with a washer 64 to facilitate assembly of the parts. A pair of compression springs 65 are centered by collars 66 on the guide pins 50 and exert a pressure on the base plate 49 and the threaded sections of inner tubular support 34 through the load spindle 35 and the spider 37, for the purpose of preventing axial "back-lash" even in the presence of worn threads. A washer 67 is interposed between the inner drum 57 and the load handwheel 40, which rotate at different speeds, to provide a bearing surface between the two.

By turning the load handwheel 40 in a clockwise direction, the spindle 35 and the spider 37 are traversed to the left along the penetration axis, carrying the barrel dial, the planetary gearing assembly, and the base plate 49. The spur gears 56 rotate and turn the spur gear 58, the inner drum 57, and the barrel dial 47. By choosing suitable gear ratios, the inner drum and the barrel dial can be made to turn at a greater speed (or through a greater angle), than the load handwheel 40.

A pointer 68 comprising an angle shaped member, on the front side of which is engraved a fine line, is fastened to the underside of the non-rotating base plate 49 by means of a screw 68a and acts as a reference line for the "set" position of the barrel dial, and for indicating hardness readings. The load spring 20 is restrained against rotational movement by two hardened steel balls 69 received in openings 70 on either side of the spring. The balls are retained in position by double-locking set screws 71 received in threaded engagement in the holes 70, and make sliding contact with the ground surfaces of two hardened steel buttons 72, which are press-fitted into an opening 73 in the load spring and protrude from the surface thereof. The cap 33 is received upon a pair of precision dowel pins 74 mounted in the bracket 9, and thus may be removed without disturbing the alignment of the penetrator spindle assembly on the penetration axis. A stainless steel protective plate 75 is secured to the bracket 9 by a plurality of stainless steel machine screws 76. A load indicator guard bracket 82, which I prefer to make of light-weight material such as aluminum alloy, is secured to the main frame base by machine screws 83. A dial light 84 is provided with an adjustable beam reflector 85 and is connected to a power supply system by means of a switch 86.

The specimen to be hardness tested is held against the face of the anvil 14 (or by some other type of anvil, depending upon the shape of the specimen), and is also supported by a second anvil 77 which is made of hardened stainless steel and provided with a flat smooth surface. A supporting spindle 78 for the second anvil is threaded into the main frame 6 for threading movement on an axis transverse to the penetration axis. A lock nut 79 is threaded on the spindle to secure the anvil 77 in the vertically adjusted position by locking engagement of the nut with the main frame.

If the specimen to be hardness tested is highly irregular in shape, the anvil 77 may be removed and replaced by a suitable holding fixture which is bolted to the main frame by means of hardened stainless steel inserts 80 threaded into the base and secured in place by dowel pins 81.

Cylindrical work should be tested with a V-notch anvil or an equivalent support, which will orient the specimen on the penetration axis. Flat-surfaced specimens should be tested on an anvil of the type shown, which has a smooth flat surface perpendicular to the penetration axis. For thin work specimens, or specimens which are not perfectly flat, the anvil should have an elevated flat surface of relatively small area.

In making a hardness test, all paint, scale or other surface deposits should be removed from the work in the area of the surface to be tested and in the area to be in contact with the anvils.

After the work has been placed and supported on the appropriate anvils and the anvil spindles adjusted and locked in position, the face of the dial indicator is turned by means of its bezel 23a until the circular dot mark on the indicator dial coincides with the position of the dial pointer, to provide a no-load calibration of the dial indicator. The load handwheel is then turned in a clockwise direction until the penetrator is resisted by the specimen and the pointer on the dial indicator coincides with the line on the dial marked Set. The force or load thus applied by the penetrator to the surface of the specimen is generally referred to as the "minor" load, applied to avoid inaccuracy due to surface imperfections in the specimen. The penetration caused by the minor load provides a reference point from which the depth of penetration caused by a major load may be measured to determine the hardness of the specimen. The barrel dial 47 is then turned by hand (relative to the handwheel), until the line marked "0" and "100" on the engraved scale coincides with the reference line on the fixed pointer 68. The load handwheel is again turned in a clockwise direction, the barrel dial turning in the same direction but through a greater angle, until the pointer on the dial indicator coincides with one of the lines on the dial marked (F,H,A), (D,E,B) or (C,G,K), respectively. The selection of one of these loadings depends in part upon the kind of penetrator used, and is determined by the relative hardness of the work being tested, as is well known to those skilled in the art. The load thus applied represents the major load. After the dial pointer comes to rest at the chosen line without further "sinking" of the penetrator into the specimen, the load handwheel is immediately turned in a counter-clockwise direction until the pointer of the dial indicator again coincides with the line on the dial marked Set. The appropriate scale reading on the barrel dial (B or C scale) which then coincides with the reference line on the fixed pointer 68 gives the hardness number of the specimen being tested, either directly or by a conversion table or chart, depending upon the type of penetrator and the loading used in making the test. After noting the hardness number, the load handwheel is turned further in the counter-clockwise direction to remove the penetrator from the surface of the specimen, as indicated by the return of the pointer on the dial indicator to its no-load position coinciding with the dot position on the dial.

Although I have shown and described a specific embodiment of my invention for illustrative purposes, it is to be understood that the invention is not limited to the specific mechanical details described, for numerous modifications within the spirit of the invention will readily occur to one skilled in the art to which it pertains. Therefore, it is my intention that the limits of the invention be defined only by the appended claims.

Having thus disclosed my invention, what I claim as new and desire to secure by Letters Patent of the United States is:

1. A hardness tester comprising, in combination: support means, anvil means adjustably mounted in said support means for supporting a specimen to be tested, a specimen penetrator mounted in said support means for movement along a penetration axis, a spindle assembly threadedly engaged in said support means for movement along said axis to apply a load to said penetrator, a base plate mounted on said spindle assembly for relative rotation, a plurality of guide pins secured to said base plate and received in said support means for sliding movement along said axis, means including a load spring imposed between said spindle assembly and said penetrator for measuring the load applied to said penetrator, means drivingly engaged with said spindle assembly for measuring the movement of said penetrator along said axis, and a plurality of compression springs each disposed about one of said guide pins and imposed between said support means and said spindle assembly to bias said spindle assembly along said axis in a direction opposite to the load applied to said penetrator, said compression spring means opposing back-lash movement between said spindle assembly and said support means due to looseness of the threaded engagement thereof.

2. A hardness tester comprising, in combination: support means, anvil means adjustably mounted in said support means for supporting a specimen to be tested, a specimen penetrator mounted in said support means for movement along a penetration axis, a spindle assembly threadedly engaged in said support means for movement along said axis to apply a load to said penetrator, a base plate mounted on said spindle assembly in relatively rotatable axial thrust-transmitting relationship, a plurality of guide pins secured to said base plate and received in said support means for sliding movement along said axis, means for measuring the load applied to said penetrator, means for measuring the movement of said penetrator along said axis, and a plurality of compression springs each disposed about one of said guide pins and imposed between said support means and said base plate to bias said spindle assembly along said axis in a direction opposite to the load applied to said penetrator, said compression spring means opposing back-lash movement between said spindle assembly and said support means due to looseness of the threaded engagement thereof.

References Cited in the file of this patent

UNITED STATES PATENTS

| | | |
|---|---|---|
| 1,209,350 | Steiner | Dec. 19, 1916 |
| 1,770,045 | Shore et al. | July 8, 1930 |
| 1,973,333 | Craemer | Sept. 11, 1934 |
| 2,448,486 | Chester | Aug. 31, 1948 |
| 2,466,567 | Williams | Apr. 5, 1949 |
| 2,643,544 | Chester | June 30, 1953 |
| 2,693,698 | Scott | Nov. 9, 1954 |
| 2,976,723 | Eddy | Mar. 28, 1961 |

OTHER REFERENCES

"Hirth Minimeter," published by Falkiner Machinery Co., 1933.